(12) United States Patent
Tsuzuki

(10) Patent No.: US 9,126,195 B2
(45) Date of Patent: Sep. 8, 2015

(54) PRETREATED CATION-EXCHANGE RESIN, TREATION METHOD OF THE RESIN, AND MIXED BED WITH CATION-EXCHANGE RESIN

(71) Applicant: Rohm and Haas Company, Philadelphia, PA (US)

(72) Inventor: Shintaro Tsuzuki, Saitama (JP)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 13/660,185

(22) Filed: Oct. 25, 2012

(65) Prior Publication Data

US 2013/0109769 A1 May 2, 2013

(30) Foreign Application Priority Data

Oct. 28, 2011 (JP) .................... 2011-237855

(51) Int. Cl.
| | |
|---|---|
| *B01J 39/08* | (2006.01) |
| *B01J 39/16* | (2006.01) |
| *B01J 47/00* | (2006.01) |
| *B01J 47/04* | (2006.01) |
| *C02F 1/42* | (2006.01) |

(52) U.S. Cl.
CPC *B01J 39/08* (2013.01); *B01J 39/16* (2013.01); *B01J 47/006* (2013.01); *B01J 47/04* (2013.01); *C02F 1/42* (2013.01); *C02F 2001/425* (2013.01); *C02F 2001/427* (2013.01)

(58) Field of Classification Search
USPC .......................................... 521/28
See application file for complete search history.

(56) References Cited

U.S. PATENT DOCUMENTS

| | | | |
|---|---|---|---|
| 2,961,417 A | 11/1960 | Small | |
| 3,639,208 A * | 2/1972 | Varveri et al. ............... | 162/168.4 |
| 4,276,406 A | 6/1981 | Monnerat et al. | |
| 4,347,328 A * | 8/1982 | Harmon et al. ................. | 521/28 |
| 4,511,677 A * | 4/1985 | Horton et al. ................... | 521/28 |
| 5,902,833 A * | 5/1999 | Tasaki ............................. | 521/28 |
| 6,060,526 A * | 5/2000 | Tasaki ............................. | 521/28 |
| 2004/0039070 A1* | 2/2004 | Parker, Jr. ...................... | 521/28 |
| 2010/0130626 A1 | 5/2010 | Fukui et al. | |

FOREIGN PATENT DOCUMENTS

| | | |
|---|---|---|
| EP | 2586530 A1 * | 5/2013 |
| JP | 57-021978 * | 2/1982 |
| JP | 5721978 | 2/1982 |
| JP | 10202118 | 8/1998 |

* cited by examiner

*Primary Examiner* — Peter D Mulcahy
*Assistant Examiner* — Henry Hu
(74) *Attorney, Agent, or Firm* — Carl P. Hemenway

(57) ABSTRACT

The present invention provides cationic exchange resin that maintains a high exchange speed of polyvalent ions in addition to monovalent ions without agglomeration occurring in spite of surface coating even when mixed bed ion-exchange resin is used.

10 Claims, No Drawings

PRETREATED CATION-EXCHANGE RESIN, TREATION METHOD OF THE RESIN, AND MIXED BED WITH CATION-EXCHANGE RESIN

The present invention concerns cationic exchange resin pretreated with specific water-soluble cationic polymer electrolyte as well as mixed bed ion-exchange resin incorporating this.

Mixed bed ion-exchange resin is used in order to remove ionic impurities from liquids in the electronic industry, steam/nuclear power plants and the like. Mixed bed ion-exchange resin has cationic exchange resin and anionic exchange resin packed in the same resin bed. However, when cationic exchange resin and anionic exchange resin are packed in a given tower, these resins mutually adhere and agglomeration is known to occur. When this agglomeration occurs, channeling of the resin (the phenomenon of volumetric expansion without peak density of packed resin due to adhesion of cationic exchange resin and anionic exchange resin) or mutual surface contamination occur.

Various methods have been examined in order to prevent agglomeration. First, a method of coating treatment of the surface of anionic exchange resin has been developed. For example, Japanese Kokai Publication Hei-10-156194 discloses anionic exchange resin pretreated by bringing it into contact with sulfonated poly (vinyl aromatic) polymer electrolyte and mixed bed system ion-exchange resin that uses said anionic exchange resin. The method of coating treatment of the surfaces of anionic exchange resin and cationic exchange resin has been examined as another method. For example, Japanese Kokai Publication 2003-176371 discloses mixed bed ion-exchange resin that is extractable in which anionic exchange resin is pretreated with water-soluble sulfonated poly (vinyl aromatic) polymer electrolyte while cationic exchange resin is pretreated with water-soluble cationic polymer electrolyte selected from among poly (vinyl aromatic) quaternary amines, poly (vinyl aromatic) tertiary amine acid-salt, and poly (vinyl pyridine) acid-salt.

However, various problems arise such as a decline in the ion-exchange capability of anionic exchange resin when the surface of anionic exchange resin is coated. For example, the adsorption rate of anionic polymers, which are impurities contained in treated water, as well as the amount of saturation adsorption decline so that adsorption removal of anionic polymers cannot be completed. Additionally, the reaction rate of anionic exchange resin declines, with the result being that the removal of anionic constituents such as sulfate ions or nitrate ions becomes impossible. Thus, cationic resin products subjected to coating treatment is desirable rather than coating treatment of anionic resin in order to prevent agglomeration in fields in which the removal of these anionic impurities is important.

An example of coating cationic exchange resin is disclosed in Japanese Kokai Publication Sho-57-21978 that discusses a method of treating boiler condenser cooling water by circulating boiler condenser cooling water through a mixed bed ion-exchange resin apparatus, wherein said technology is characterized by the use of strongly acidic cationic exchange resin that had been treated with cationic polymer electrolyte. In addition, Japanese Kokai Publication Hei-10-202118 discloses ion-exchange resin with linear polymer electrolyte having molecular weight of 50,000 or more adhering to the surface. These literatures discuss cationic polymer electrolytes only. What is actually exemplified is the phenyl groups of polystyrenes such as poly (trimethylammonium methylstyrene), etc., to which primary-tertiary amines or quaternary ammonium groups are bound directly or via alkyl groups, or polymers of (meth) acrylic acid such as vinyl pyridine or its derivatives, or poly (methacryloxyethyl trimethylammonium), etc., to which primary-tertiary amines or quaternary ammonium groups are bound via ester bonds or amide bonds. Research conducted by the inventors revealed that cationic exchange resin treated with these compounds presents no problems in ion exchange of monovalent ions (sodium, potassium, etc.), but polyvalent ions (calcium ions, magnesium ions, etc.) involve a decline in the ion-exchange resin rate as well as leakage of the cured constituents (calcium, magnesium).

Literature includes Gazette of Japanese Kokai Publication Hei-10-156194, Gazette of Japanese Kokai Publication 2003-176371, Gazette of Japanese Kokai Publication Sho-57-21978, and Gazette of Japanese Kokai Publication Hei-10-202118

Summary of Invention is as follows.
Problems Solved by the Invention are as follows.
Thus, the objective of the present invention is to provide cationic exchange resin that maintains a high exchange speed of polyvalent ions in addition to monovalent ions, especially to provide mixed bed ion-exchange resin having high adsorption capability of anionic polymers and of other anionic constituents that is capable of effectively preventing channeling due to agglomeration and of mutual surface contamination.

Means of Solving the Problems are as follows.
The inventors have conducted thorough research to resolve aforementioned problems, the results of which revealed that creating mixed bed ion-exchange resin in which cationic exchange resin is pretreated with water-soluble cationic polymer electrolyte containing a specific quaternary amine structure, followed by mixture with anionic exchange resin without surface treatment, permits the creation of mixed bed system ion-exchange resin that is resistant to agglomeration while maintaining the anionic exchange speed (capacity) at the pretreatment speed (capacity). That discovery completed the present invention.

Effects of Invention are as follows.
Mixed bed system ion-exchange resin that is resistant to agglomeration can be derived by using pretreated cationic exchange resin pursuant to the present invention. The cationic exchange resin pursuant to the present invention has cationic exchange speed (capacity) equal to that preceding treatment, and the exchange capacity of bivalent cations especially is superior in comparison to conventional treatment methods.

Best Mode for Implementing Invention is as follows
In the specification of the present invention, ° C. denotes the centigrade temperature, g denotes grams, mg denotes milligrams, L denotes liters, and mL denotes milliliters. All amounts are weight percentages unless otherwise stated.

The water-soluble cationic polymer electrolyte used in the present invention is a compound with an intramolecular cyclic quaternary ammonium salt structure. Concrete examples of compounds with an intramolecular cyclic quaternary ammonium salt structure are presented in general formula [1] below.

First chemical formula:

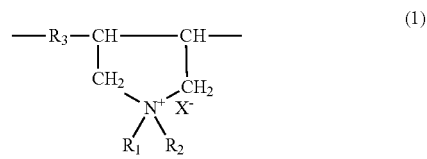

(1)

One example is the polymer compound with the structural units shown above. Here, $R_1$ and $R_2$ independently denote straight-chain or branched alkyl groups having 1 to 10 carbon atoms that may have substituents. Permissible examples of alkyl substituents include hydroxyl groups and carboxyl groups. $R_1$ and $R_2$ preferably would be straight-chain alkyl groups having 1 to 4 carbon atoms. $R_3$ represents a single bond or an alkylene group having 1 to 5 carbon atoms. X would be selected from among chlorine, bromine, iodine or OH.

Water-soluble cationic polymer electrolytes may be copolymers with other polymeric compounds so long as they have structural units represented by aforementioned general formula [1]. Permissible examples of other monomers that can be copolymerized include acrylic-acid esters, styrene or acrylmides. These other monomers may have substituents.

A desirable concrete example of a water-soluble cationic polymer electrolyte having the structural units shown in general formula [1] would be a salt of polydiallyl dimethylammonium. More desirable would be polydiallyl dimethylammonium chloride, polydiallyl diethylammonium chloride, polydiallyl dimethylammonium bromide, and polydiallyl dimethylammonium hydroxide.

The molecular weight of compounds having an intramolecular cyclic quaternary ammonium salt structure would be a number average molecular weight in the range of 5000 to 10,000,000, preferably a range of 50,000 to 500,000, and still more preferably a range of 80,000 to 200,000. The number average molecular weight is measured by (GPC) gel permeation chromatography using a suitable molecular weight standard.

In the present specification, "treated by water-soluble cationic polymer electrolyte" signifies that the surface charge of cationic exchange resin had been reduced through treatment using water-soluble cationic polymer electrolyte.

The method of treating cationic exchange resin via water-soluble cationic polymer electrolyte may be any method so long as it allows the adhesion of water-soluble cationic polymer electrolytes without disintegration of cationic exchange resin. For example, one method would involve adding an aqueous solution containing water-soluble cationic polymer electrolyte and cationic exchange resin to a container followed by bringing them into adequate mutual contact. One permissible method of bringing them into contact would involve gentle stirring of water-soluble cationic polymer electrolyte, cationic exchange resin and water in a container. Part or all of the surface of cationic exchange resin is coated by attaining contact with water-soluble cationic polymer electrolyte. Cationic exchange resin preferably would be coated by water-soluble cationic polymer electrolyte sufficiently so that the cationic exchange capacity does not decline by adjusting the molecular weight of water-soluble cationic polymer electrolyte and the amount of coating.

The amount of treatment of water-soluble cationic polymer electrolytes should be an amount adequate to reduce the surface charge exhibited by cationic exchange resin beads, specifically, a moderate amount of water-soluble cationic polymer electrolyte. The range should be 10 to 500 mg per liter of cationic exchange resin, preferably a range of 40 to 150 mg, most preferably a range of 60 to 100 mg. The treatment temperature should be in the range of room temperature to 80° C., preferably 50 to 60° C. The treatment duration varies with the treatment temperature, but the range would commonly be 0.1 to 24 hours, preferably 0.5 to 2 hours. The cationic exchange resin should be rinsed with an adequate amount of deionized water following treatment.

The water-soluble cationic polymer electrolyte that is added adheres virtually quantitatively to cationic exchange resin. Accordingly, the amount of coating water-soluble cationic polymer electrolyte would be in the range of 10 to 500 mg per liter of cationic exchange resin, preferably a range of 40 to 150 mg, more preferably a range of 60 to 100 mg.

In the specification, the term "ion-exchange resin" is the term commonly used in the technological field in question. In general, it signifies the gel type or macroreticular type of ion-exchange resin that may be mildly acidic or strongly acidic cationic exchange resin, or mildly basic or strongly basic anionic exchange resin. There is no specific limitation on the cationic exchange resin or anionic exchange resin in the present invention, and known resins used in the technological field in question may be used.

Examples of the cationic exchange resin and anionic exchange resin include monovinylidene aromatic crosslinked polymer, or (meth) acrylic acid ester-based crosslinked polymer. Concrete examples include resins derived from monovinylidene aromatic monomers such as styrene or vinyl toluene and copolymerizable crosslinking agents, as well as resins derived from acrylic monomers such as acrylic acid or methacrylic acid and copolymerizable crosslinking agents. Desirable crosslinking agents include di- or polyvinylidene aromatic agents such as divinyl benzene and divinyl toluene, or ethylene glycol dimethacrylate.

Strongly acidic cationic exchange resins have sulfonic-acid groups or phosphonic-acid groups as the functional group, while mildly acidic cationic exchange resins have carboxylic-acid groups, phosphinic-acid groups, phenoxide groups, arensite groups and the like. Strongly basic anionic exchange resins would have quaternary ammonium groups as the functional group, while mildly basic anionic exchange resins would have primary amino groups, secondary amino groups or tertiary amino groups as the functional group.

The mixed bed ion-exchange resin pursuant to the present invention preferably would contain strongly acidic cationic exchange resin and strongly basic anionic exchange resin. Strongly acidic cationic exchange resin preferably would be monovinylidene aromatic crosslinked polymers containing sulfonic acid groups or phosphonic acid groups, and sulfonated compounds of monovinylidene aromatic compounds and copolymerizable crosslinking agents would be especially preferable. Strongly basic anionic exchange resin preferably would be crosslinked polymers of monovinylidene aromatic compounds with quaternary ammonium groups. Among desirable cationic exchange resins and anionic exchange resins, the preferable monovinylidene aromatic compound would be styrene, while the preferable crosslinking agent would be vinyl benzene.

The ion-exchange resin used in the present invention typically would be prepared in the form of polymer beads having a mean volume particle diameter in the range of approximately 0.15 to approximately 1.0 millimeter (mm), preferably a range of approximately 0.3 to approximately 0.7 mm Examples of representative commercial cationic exchange resins suitable for use in the mixed bed system of the present invention include Amberlite (trademark) IR120, Amberjet (trademark) 1500 and Ambersep (trademark) 200. Examples of representative commercial anionic exchange resins suitable for use in the mixed bed system of the present invention include 900 Amberlite IRA402, Amberjet 4400 and Ambersep 200. Amberlite, Amberjet and Ambersep are trademarks of Rohm & Haas Company.

In the mixed bed system ion-exchange resin, the packing ratio of cationic exchange resin and anionic exchange resin varies with the objective of use of the ion-exchange resin, but it usually would be in the range of 1/99 to 99/1 as the volumetric ratio of cationic exchange resin/anionic exchange resin, preferably a range of 1/10 to 10/1, most preferably a range of 1/2 to 2/1.

The term "reduces the surface charge" signifies that the surface charge of cationic exchange resin beads is reduced relative to the surface charge of untreated cationic exchange resin through treatment with cationic polymer electrolyte. A reduction in the surface charge of treated, cationic exchange resin is demonstrated by a reduction in agglomeration (clumping) between treated cationic exchange resin and anionic ion-exchange resin that has different ionic characteristics.

Agglomeration can be easily measured using common techniques known to those skilled in the art. For example, a known accumulation of cationic exchange resin and anionic exchange resin can be mixed, mixed bed resin can be deposited, and the volume of the deposited mixed bed resin can be measured. Agglomeration can be determined through the increase in volume of the mixed bed resin following comparison with the total volume of the cationic- and anionic exchange resin constituents.

The present invention is explained in further detail below through embodiments, but the present invention is not restricted to these embodiments.

Embodiments are as follows.

Embodiment 1 is as follows.

A column was packed with one liter of strongly acidic cationic exchange resin (proprietary name: Amberjet 1500, hydrogen type) and the column was then filled with deionized water. A total of 60 mg of poly (diallyl dimethylammonium chloride): [PADMAC] (product of Nalco Chemical Co.) having number average molecular weight of 100,000 was dissolved as water-soluble cationic polymer electrolyte in deionized water and then circulated into aforementioned column. This was stirred for one hour at 60° C. under air mixing, followed by adequate washing with deionized water to derive strongly acidic cationic exchange resin treated with water-soluble cationic polymer electrolyte.

Agglomeration Test: Agglomeration tests pursuant to the method stated in paragraph 0022 of Japanese Kokai Publication Hei-2003-176371 were carried out on the resulting water-soluble cationic polymer electrolyte-treated strongly acidic cationic exchange resin. The results are presented below.

Analysis value: 50 (no agglomeration)

Ion-exchange Capacity Measurement Method is as follows.

A total of 50 ml of the cationic exchange resin from Embodiment 1 and 50 ml of anionic exchange resin (proprietary name Amberjet 4400, (OH type) were mixed with 100 ml of deionized water and packed in a column (Φ25 mm)

Liquid containing monovalent and bivalent ions for the test were each passed through aforementioned column, and the ion concentration following passage through the column was measured. Aqueous solutions containing 5 ppm of $Na^+$, $K^+$, $Ca^{2+}$ and $Mg^{2+}$ were prepared as liquids containing ions (four types of aqueous solutions were prepared) and the ion-exchange capacities were measured. Table 2 presents the results.

Embodiment 2 is as follows.

The same operations as in Embodiment 1 were repeated except for the use of 100 mg of poly diallyldimethylammonium chloride instead of the 60 mg of poly diallyl dimethylammonium chloride having number average molecular weight of 100,000 that was used in Embodiment 1. That derived cationic exchange resin whose surface was coated.

Comparative Examples 1 to 4 are as follows.

The same operations as in Embodiment 1 were repeated except for the use of compounds presented in Table 1 instead of the 60 mg of poly diallyl dimethylammonium chloride having number average molecular weight of 100,000. That derived cationic exchange resins (the resin of Comparative Example 1 was untreated) whose surfaces were coated.

TABLE 1

| Embodiment or Comparative Example | Type of water-soluble cationic polymer electrolyte | Amount (mg) |
|---|---|---|
| Embodiment 1 | PADMAC | 60 |
| Embodiment 2 | PADMAC | 100 |
| Comparative Example 1 | (none) | — |
| Comparative Example 2 | poly(vinyl pyridine)ester | 60 |
| Comparative Example 3 | polyvinlbenzyl trimethylammonium chloride | 60 |
| Comparative Example 4 | polyvinyl benzyl dimethylamine ester | 60 |

The cationic exchange resins of Embodiment 2 and of Comparative Examples 1 to 4 were packed in a column with anionic exchange resin in the same manner as in Embodiment 1, and the ion-exchange capacities were measured. Table 2 presents the results. The ion-exchange capacity was not measured in Comparative Example 1 because channeling developed.

TABLE 2

| | Concentration following treatment (ppb) | | | |
|---|---|---|---|---|
| Type of ion | Na | K | Ca | Mg |
| Embodiment 1 | <1 | <1 | <1 | <1 |
| Embodiment 2 | <1 | <1 | <1 | <1 |
| Comparative Example 2 | <1 | <1 | 800 | 700 |
| Comparative Example 3 | 100 | 100 | 700 | 700 |
| Comparative Example 4 | 100 | 100 | 700 | 800 |

The invention claimed is:

1. A mixed bed ion-exchange resin comprising a cationic exchange resin and an anionic exchange resin, wherein said cationic exchange resin has been treated by a water-soluble cationic polymer electrolyte, and wherein said water-soluble cationic polymer electrolyte contains an intramolecular cyclic quaternary ammonium salt structure.

2. The mixed bed ion-exchange resin of claim 1 in which the surface of the anionic exchange resin is untreated.

3. The mixed bed ion-exchange resin of claim 1, wherein said water-soluble cationic polymer electrolyte consists of structural units having intramolecular cyclic quaternary ammonium salt structures.

4. The mixed bed ion-exchange resin of claim 1, wherein said water-soluble cationic polymer electrolyte is a homopolymer selected from the group consisting of polydiallyl dimethyl ammonium chloride, polydiallyl diethyl ammonium chloride, polydiallyl dimethyl ammonium bromide, and polydiallyl dimethyl ammonium hydroxide.

5. The mixed bed ion-exchange resin of claim 1, wherein said water-soluble cationic polymer electrolyte contains structural units of structure (1):

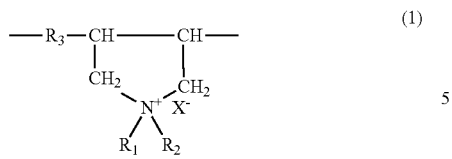

wherein R1 and R2 are independently alkyl groups having 1 to 10 carbon atoms, and wherein each R3 is an alkylene group having 1 to 5 carbon atoms, and wherein X is selected from the group consisting of chlorine, bromine, iodine, and OH.

6. The mixed bed ion-exchange resin of claim 1, wherein said water-soluble cationic polymer electrolyte consists of structural units of said structure (1).

7. The mixed bed ion-exchange resin of claim 1, wherein said cationic exchange resin is a strongly acidic cationic exchange resin.

8. The mixed bed ion-exchange resin of claim 1, wherein said water-soluble cationic polymer electrolyte is present in an amount of 10 to 500 mg per liter of said cationic exchange resin.

9. The mixed bed ion-exchange resin of claim 1, wherein said cationic exchange resin is present as polymer beads having a mean volume particle diameter of 0.15 to 1.0 mm.

10. The mixed bed ion-exchange resin of claim 1, wherein said cationic polymer electrolyte has number average molecular weight of 80,000 to 200,000.

\* \* \* \* \*